Oct. 5, 1965 R. A. CRANE ETAL 3,209,581

CONTINUOUS MELT INDEXER

Filed Feb. 7, 1962 4 Sheets-Sheet 1

INVENTOR.
ROBERT A. CRANE &
STANLEY A. MURDOCK
BY
Jerome Gudig
ATT'Y

CONTINUOUS MELT INDEXER

Filed Feb. 7, 1962

INVENTORS
ROBERT A. CRANE &
STANLEY A. MURDOCK
BY
ATT'Y

INVENTOR.
ROBERT A. CRANE &
STANLEY A. MURDOCK
BY
ATT'Y

CONTINUOUS MELT INDEXER

Filed Feb. 7, 1962

MELT INDEX

INVENTOR.
ROBERT A. CRANE &
STANLEY A. MURDOCK
BY
[signature]
ATT'Y

United States Patent Office 3,209,581
Patented Oct. 5, 1965

3,209,581
CONTINUOUS MELT INDEXER

Robert A. Crane and Stanley A. Murdock, Concord, Calif., assignors to The Dow Chemical Company, Midland, Mich., a corporation of Delaware Filed Feb. 7, 1962, Ser. No. 171,709
5 Claims. (Cl. 73—55)

This invention relates to a method and apparatus for the continuous measurement of the melt index of a plastic material.

Melt index has traditionally been determined by a hand operated machine, the results from which are very sensitive to minor differences in technique between operators. The melt index test is widely used to determine the flow characteristics of a polymer, and is important in quality control for efficient plant operation.

A standard melt index test according to an American Society of Testing Materials procedure, determines the weight of a polymer, at a controlled temperature, that flows through an orifice in a given length of time under a constant pressure. A temperature of 190° C. and a load of 2160 grams on a piston having a diameter of 0.373±0.0004 inch is used for standard polypropylene melt index tests. The orifice through which the polymer passes is 0.315±0.001 inch long and 0.0825±0.0002 inch in diameter.

These conditions result in the polymer melt being subjected to a force of 43.25 pounds per square inch. The flow rate of course depends upon the melt index of the material and for polypropylene (density 0.91) will vary between 0.01 cc./min. for melt index 0.1, and 1.133 cc./min. for melt index 10.0. The corresponding shear rate range is from 0.204 $sec.^{-1}$ to 20.4 $sec.^{-1}$ for the 0.0825 inch orifice.

The manual method of determining melt index has many disadvantages, such as time required to attain a sample of the material, transporting the sample to the laboratory, sample measurement, data recording, and transmission of information obtained.

The method and apparatus of the subject invention provides a continuous, automatic and accurate measurement of melt index at any moment, hence, may be employed in quality control procedures to achieve efficient plant operation. Briefly, the inventive concept involves the measurement of pressure drop in a polymer flow through an orifice which discharges to atmosphere. The temperature of the polymer is measured and the pressure signal is automatically corrected for temperature variation. The corrected pressure signal correlates with melt index and may be used for production control purposes. Attention is directed to the temperature-viscosity relationship, namely, when temperature goes up, viscosity goes down. It will be seen that the invention utilizes standard components, and requires little, if any, maintenance.

The main object of this invention is to provide a method and apparatus for the measurement of melt index of a plastic material.

A more specific object is to provide a method and apparatus for the continuous, automatic and accurate measurement of melt index of a plastic material.

These and further objects and features of the invention will become more apparent from the following description and accompanying drawings wherein.

Figures 1, 2:
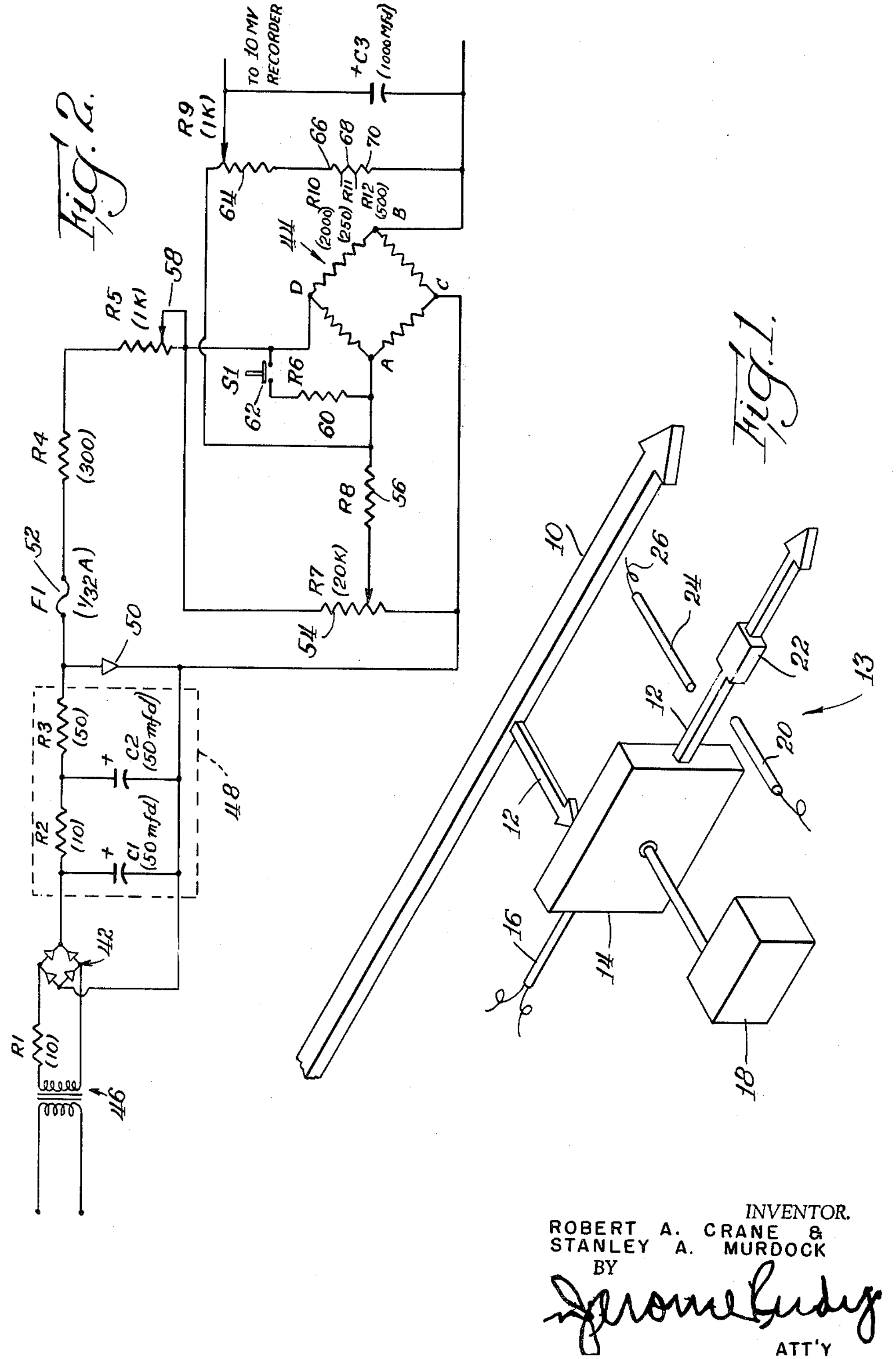
FIG. 1 is a schematic drawing which illustrates a general arrangement embodying the inventive concept.
FIG. 2 is a wiring diagram illustrative of a circuit arrangement utilized in a system embodying the principles of the invention.

Referring now to the drawing, and more particularly FIG. 1, numeral 10 identifies a main polymer stream as flowing in a plant operation, such as to a molding, or extruding machine (not shown). A sample stream 12 is caused to flow from the main stream to a melt index recorder assembly 13 which includes a metering pump 14. The pump is maintained at the temperature of the polymer stream by one or more electrical cartridge heaters 16. A synchronous drive motor 18 is arranged for operation of the pump 14. A pressure transducer 20 is arranged to measure the pressure drop of the sample stream as it moves from the pump 14 through an orifice, or capillary 22. The temperature of the polymer at point of pressure measurement is sensed by a bare thermocouple 24, having wires 26 which lead to a temperature recorder and potentiometer (not shown). The sample stream 12 is exhausted to atmosphere after passing through the capillary 22.

The foregoing describes the basic elements and the arrangement thereof, used for melt index determinations made in accordance with the invention. Obviously, a variety of choices may be made in the selection of the elements forming the arrangement, any given choice being determined with respect to the type of material to be tested, operating temperatures and pressures to be experienced, flow rates, etc.

Figures 3, 4:
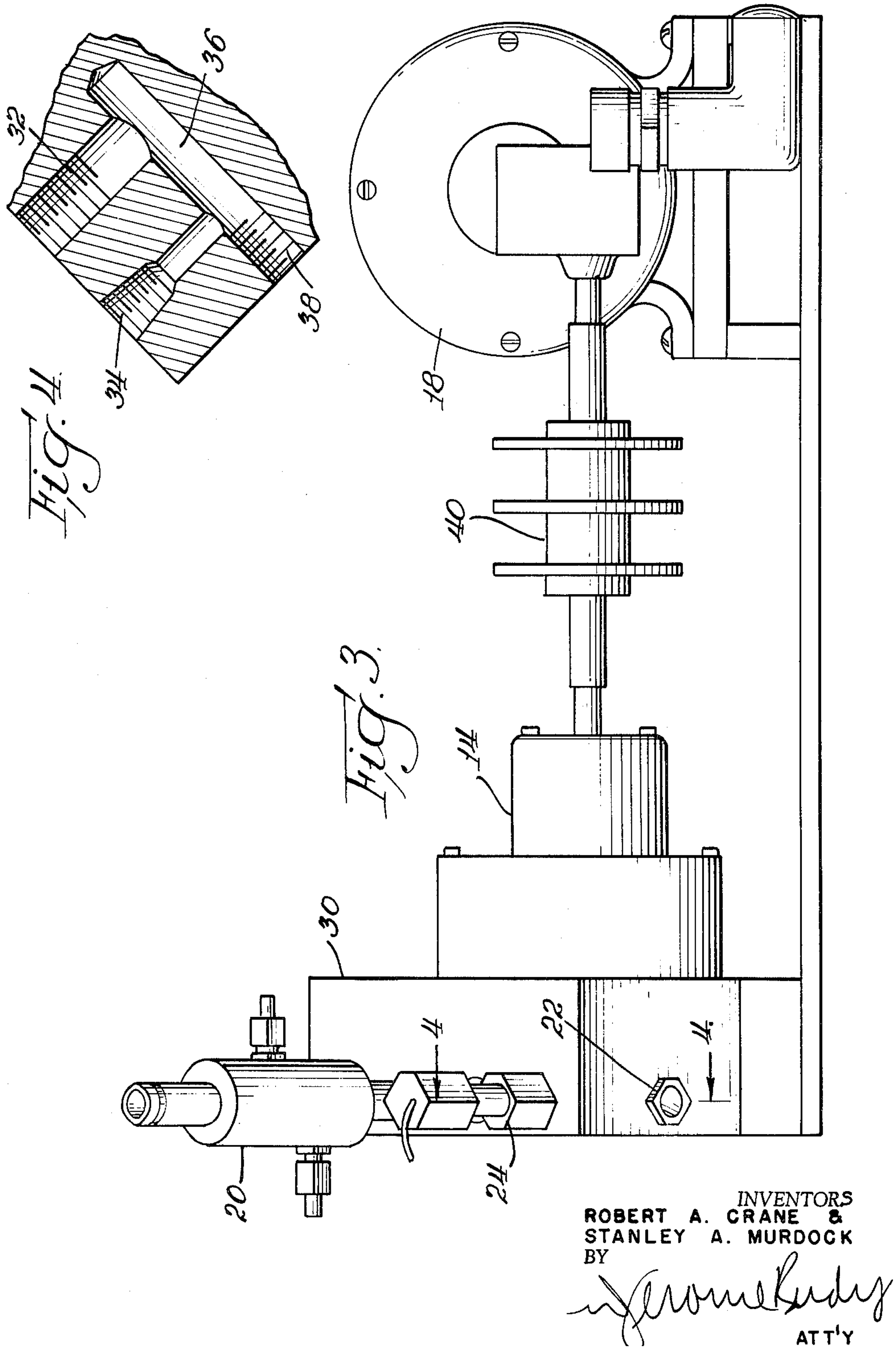
FIG. 3 is an elevation view of apparatus used in the arrangement shown in FIG. 1.
FIG. 4 is a section view generally as seen along line 4—4 in FIG. 3.

As an example, apparatus incorporating elements as above described, for continuously measuring the melt index of polypropylene is shown in FIGS. 3 and 4. A sampling block (not shown) was inserted in the polymer stream behind a die plate of an extruder. An elongated hole was provided in the block for the main polymer stream to flow through the block toward the die plate. Two 200 watt cartridge heaters were provided in the sampling block to maintain the polymer stream at 240° C. A ¼ inch diameter hole in the sample block was arranged at a right angle to the elongated hole for directing a sample of polymer to a pump mounting block 30. The mounting block is formed to provide passageways 32, 34 for mounting of the pressure transducer 20, and the temperature sensing thermocouple 24, respectively. The passawegays 32, 34 open into a passageway 36, the end 38 being threaded for receipt of the capillary 22. Passageway 36 connects through pump 14 and the pump mounting block 30 with the ¼ inch diameter hole in the sample block. Two 150 watt cartridge heaters were located in the pump mounting block. The capillary 22 had a $\frac{1}{16}$ inch diameter by ½ inch long orifice. A coupling 40 may be provided to connect the drive motor 18 with the pump 14.

The sampling block, which can be dispensed with in some instances, may be shaped as required in any given installation, such as where a flange on a large polymer line is replaced thereby. The mounting block 30 can be designed to bolt directly on to the extruder in place of the normal side plate thereof.

In one embodiment, the pump 14 was of the type made by the Zenith Products Co. of West Newton, Massachusetts, and identified as model HP4647 size 2 hot pump. A $\frac{1}{75}$ H.P., three r.p.m. synchronous gear reduced Bodine motor (No. B 2246–600 G) was used to drive the pump. A model PT–58B pressure transducer 20, range 0–500 p.s.i.g., as manufactured by the Dynamic Instrument Co. of Cambridge, Massachusetts, was used to convert the polymer pressure at the capillary into a useful measurable electrical signal. Such a transducer includes a diaphragm in contact with the molten polymer stream, whereby the pressure of the stream is converted into mechanical displacement of the diaphragm. A push rod transfers the diaphragm displacement to an unbonded strain gage assembly in a water cooled section of the transducer. The transducer was operated at 6 volts D.C. from a Zener diode stabilized supply. The transducer output was transmitted to a recorder (not shown) as manufactured by Leeds & Northrup, San Francisco, California, Speedomax Model H, 0–10 mv.

In the described embodiment, a potentiometer was adapted to be driven by a temperature recorder to modify the signal from the pressure transducer 20 in such a way as to compensate for the effect due to the temperature variation.

It was found that the pressure drop ratios vary between 1.091 and 1.166 per 10° C. increase for a melt index range of 0.4 to 10.0, and a temperature range of 230° C.–260° C. However, for a given melt index the ratio was found to be relatively constant over the temperature range. Therefore, it is possible to adequately compensate for polymer temperature changes at a given melt index by using a linear temperature dependent attenuator on the output of the pressure transducer.

An electrical circuit, which may be employed to compensate for temperature variation, is illustrated in FIG. 2. As seen therein, a conventional silicon diode full wave bridge rectifier 42 is used to provide D.C. voltage to a strain gage type pressure transducer 44. A 12.6 volt filament transformer 46 is used to supply the rectifier 42, the output of the latter being filtered by an RC filter 48 and regulated by a Zener diode 50. A 1/32 amp. fuse 52 is provided to protect the pressure transducer 44 in case of Zener diode failure. Potentiometer 54 and associated resistor 56 shunt two of the active legs of the pressure transducer so that the zero output of the pressure transducer may be set to coincide with the recorder zero when no pressure is on the pressure transducer. Potentiometer 58 is used to vary the applied voltage to the pressure transducer for span adjustment.

A calibration resistor 60 provides an electrical method for checking the output of the pressure transducer 44, for when there is no pressure on the transducer, closing a switch 62, will cause one leg of the transducer to be shunted by the resistor 60. The resistor 60 is selected so as to cause an electrical output equivalent to that produced by the application of a 500 p.s.i.g. pressure on the transducer.

An automatic temperature compensating means incorporated in the circuit, includes a single turn potentiometer 64 and associated resistors 66, 68 and 70, which means constitute a temperature dependent voltage divider on the output of the pressure transducer 44. The potentiometer 64 is gear coupled to the recorder so that an increase in the polymer temperature causes the potentiometer slider to move in a direction to increase the electrical signal received by the pressure recorder from the pressure transducer, thus compensating for the actual reduced output of the pressure transducer due to the lowered viscosity of the polymer at the elevated temperature. In other words, changes in temperature of the material being measured, causes an electro-motive force to be generated which modifies the pressure signal being transmitted to the recorder.

The recorder and potentiometer gearing are such that the potentiometer slider sweeps out 453 ohms per ten degree change in temperature. The potentiometer is positioned so that at 250° C. the slider is at the center of the 5000 ohm winding. Thus at 240° C. the slider is at 2500–453 ohms, or 2047 ohms from the bottom end. An end resistance of 2250 ohms (66 plus 68) will provide for an output ratio of 1.105 (4750/4297) between 240° C. and 250° C. The output ratio will be 1.095 (5203/4750) between 250° C. and 260° C. Adding 500 ohms (70) to make the total end resistance 2750 ohms changes the compensation so that an output ratio of 1.095 is obtained between 250° C. and 240° C. and an output ratio of 1.105 is obtained between 240° C. and 230° C.

Under normal operating conditions the polymer temperature usually does not change by more than ±5 degrees so that frequent adjustment of the resistors 66, 68 and 70 for gross shifts in temperature range is not necessary. Replacement of these resistors by a ten turn potentiometer would make it possible to vary the end resistance in order to achieve any desired output ratio to match the melt index changes or temperature range encountered.

There are many factors which make it difficult to theoretically predict the calibration curve for the apparatus described. End effects due to the short capillary used are great enough to make it generally impossible to predict the pressure drop from the empirically derived polymer flow equations. The type of polymer stabilizer and concentration used is even more important. The polymer actually degrades while a laboratory melt index determination is being made. This degradation results in different laboratory melt index values being obtained for the same continuous melt index recorder reading if the stabilizer conditions change. Therefore, it is necessary to make an empirical calibration correlation curve under actual plant conditions. This may be done by taking spot samples and preparing a plot of laboratory melt index readings vs. the continuous melt indexer recording readings for each type of material being run.

Figure 5:
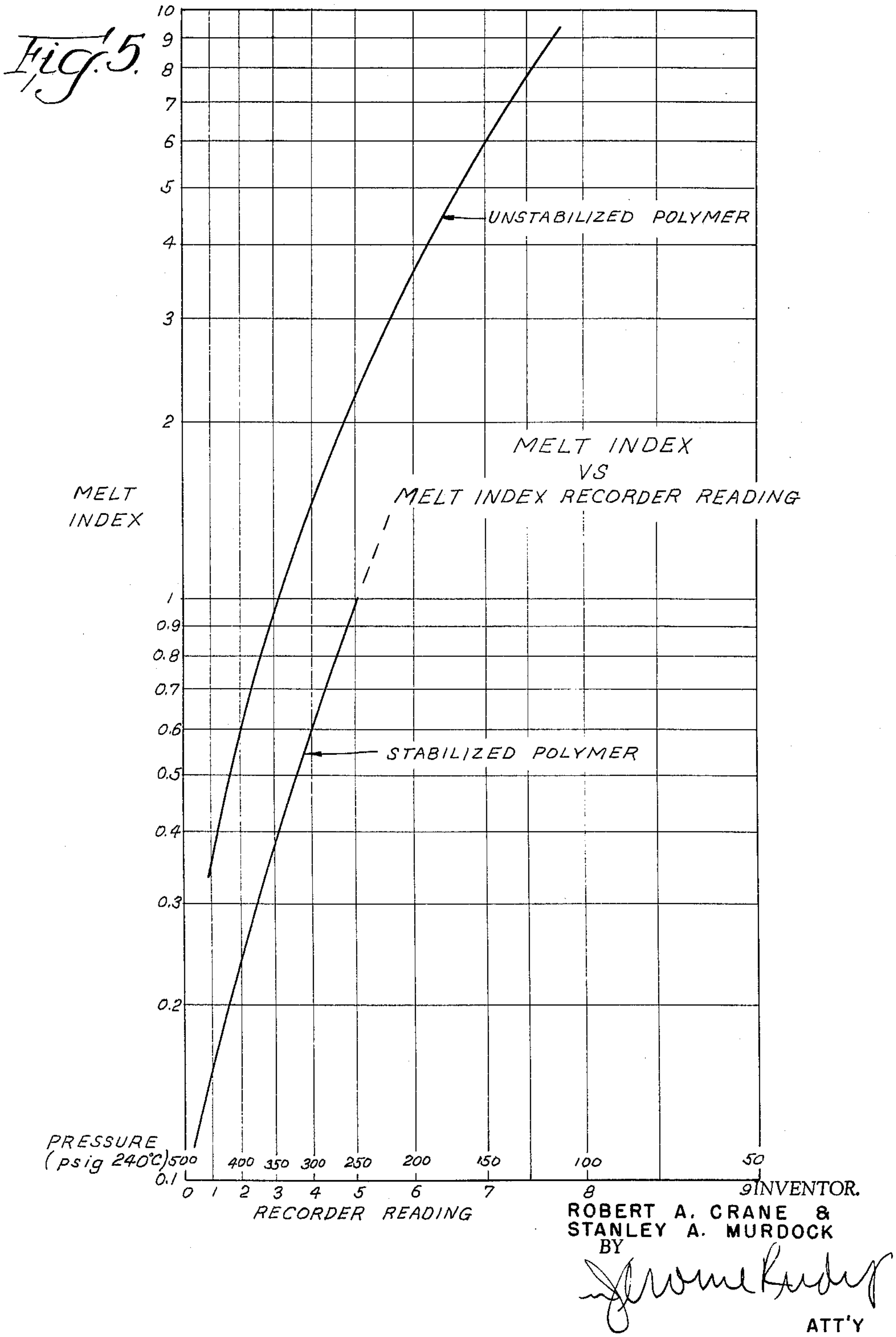
FIGS. 5 and 6 are graphs showing certain melt index data, as will be discussed hereinafter.

Reference may be made to the graph shown in FIG. 5 as an example of calibration curves for a stabilized polymer and an unstabilized polymer.

Figure 6:
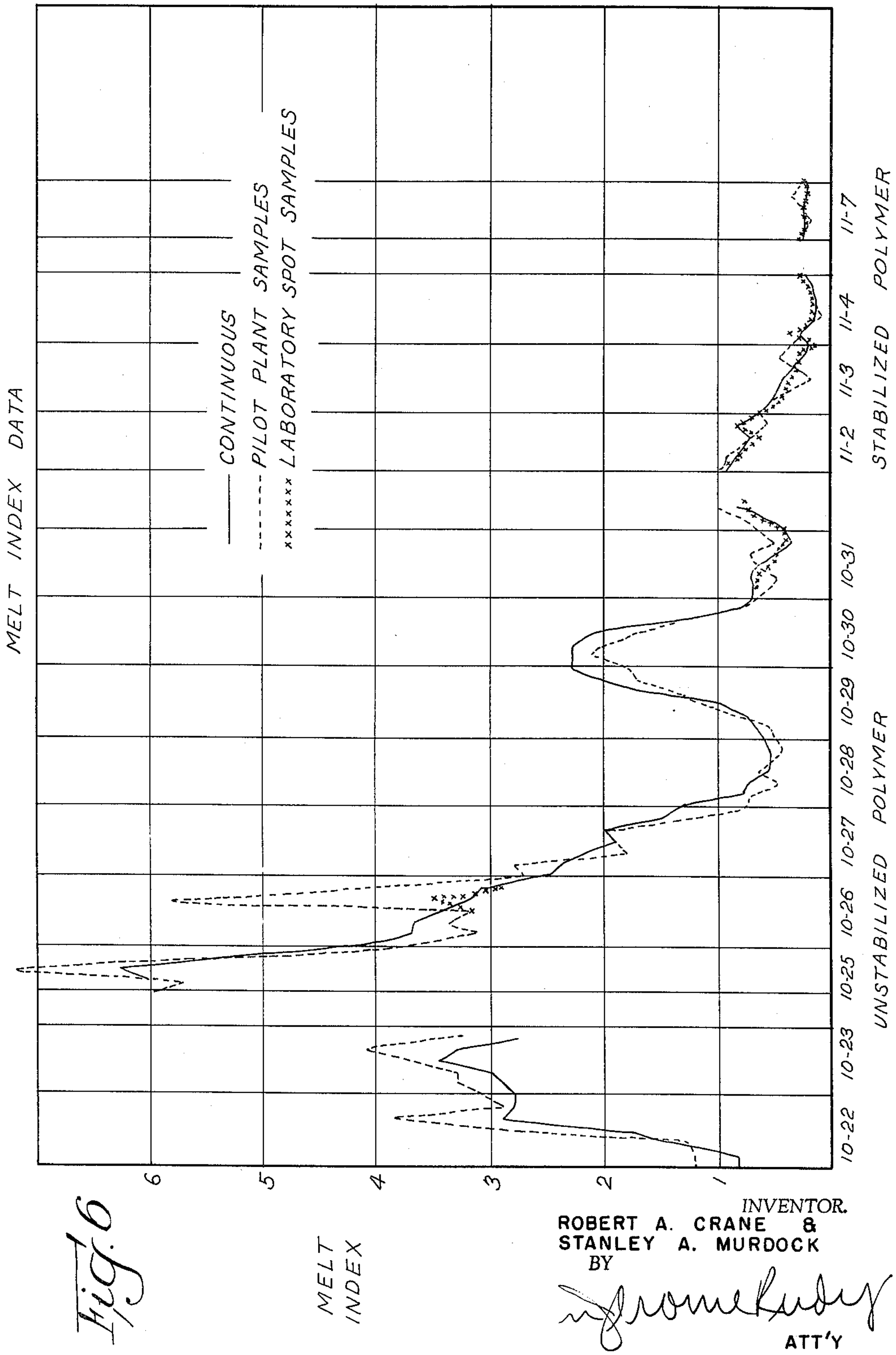

The graph shown in FIG. 6 illustrates the results of melt index determination as made by pilot plant spot sampling, laboratory spot sampling and by use of the melt indexer of the invention in a pilot plant operation, over certain periods of time, as indicated. It is apparent that the continuous melt indexer follows the changes in polymer satisfactorily over them elt index range of 0.2 to 5. Note the obvious error in operator determination of melt index by the usual method near point 10–26 (abscissa).

It will be appreciated that a melt indexer made in accordance with the principles of the invention will provide a more reliable measure of the actual polymer viscosity than laboratory melt index determinations, which are so dependent upon the skill of the operator.

The foregoing description has been given in detail without thought of limitation since the inventive principles involved are capable of assuming other forms without departing from the spirit of the invention or the scope of the following claims.

What is claimed is:

1. A method for the continuous determination of the melt index of a polymeric material comprising the steps of, diverting a sample stream of said material from a main stream being used in a production process, causing the sample stream to flow at a constant rate in a confined path while maintaining the temperature thereof substantially equal to the temperature of the material in the main stream, measuring the pressure of the sample stream of material prior to passage through a capillary which allows the sample stream of material to flow out at a atmospheric pressure measuring the temperature of said polymeric material at the point of pressure measurement, automatically correcting the measured pressure to compensate for temperature variation, and relating said corrected pressure to prepared data which indicates melt index of the material under prescribed conditions of temperature and flow rate as associated with the given capillary.

2. A method for the continuous determination of the melt index of a polymeric material comprising the steps of, diverting a sample stream of said material from a main stream being used in a production process, causing the sample stream to flow at a constant rate in a confined path while maintaining the temperature thereof substantially equal to the temperature of the material in the main stream, measuring the pressure of the sample stream of material prior to passage through a capillary which allows the sample stream of material to flow out at atmospheric pressure, transmitting the value of said pressure to a recorder which is calibrated to show melt index values, and converting the temperature of the sample stream into an electro-motive force to modify the value of the pressure signal being transmitted to said recorder.

3. A melt indexer for use in the continuous determination of the melt index of a polymeric material comprising in combination, a metering pump arranged for receipt of a sample stream of polymeric material from a main stream, a constant speed motor for operation of said pump, a capillary arranged for receipt of a sample stream of polymeric material from said pump, said capillary being further arranged to discharge said sample stream of material to atmosphere, heating means for maintaining said sample stream at substantially the same temperature as the polymeric material in the main stream, a pressure measuring means arranged to determine the pressure of the sample stream prior to passage through the capillary, and means for automatically correcting the pressure determinations of said pressure measuring means in accordance with the temperature of said material at the point of pressure measurement to compensate for temperature variations of said material.

4. A melt index recorder for use in the continuous determination of the melt index of a polymeric material comprising in combination, a constant flow delivery metering pump arranged for receipt of a sample stream of polymeric material from a main stream in a production process, a capillary arranged for receipt of a sample stream of polymeric material from said pump, said capillary consisting of the fixed diameter tube one end of which is open to atmosphere, electrical heating means for maintaining said sample stream at substantially the same temperature as the polymeric material in the main stream, a pressure transducer arranged to measure the pressure of the sample stream as it enters the capillary, a recorder for recording said pressure measurements, and means for automatically correcting the pressure determinations of said pressure transducer in accordance with the temperature of said material at the point of pressure measurement to compensate for temperature variations of said material.

5. A melt indexer for use in the continuous determination of the melt index of a polymeric material comprising in combination, a metering pump arranged for receipt of a sample stream of polymeric material from a main stream a constant speed motor for operation of said pump, a capillary arranged for receipt of a sample stream of polymeric material from said pump, said capillary being further arranged to discharge said sample stream of material to atmosphere, heating means for maintaining said sample stream at substantially the same temperature as the polymeric material in the main stream, a pressure measuring means arranged to determine the pressure of the sample stream prior to passage through the capillary and to convert said pressure into an electric signal for transmission to a recorder, and means to modify said electric signal for transmission to a recorder, and means to modify said electric signal in accordance with variations in temperature of the polymeric material.

References Cited by the Examiner

UNITED STATES PATENTS

| | | | |
|---|---|---|---|
| 2,400,910 | 5/46 | Booth | 73—55 |
| 2,459,483 | 1/49 | Zimmer et al. | 73—55 |
| 2,988,914 | 6/61 | Jones | 73—54 |
| 3,046,782 | 7/62 | Laimins | 73—141 |
| 3,048,030 | 8/62 | De Haven | 73—56 |
| 3,138,950 | 6/64 | Welty et al. | 73—56 X |

RICHARD C. QUEISSER, *Primary Examiner.*

ROBERT L. EVANS, *Examiner.*